United States Patent
Cao et al.

(10) Patent No.: US 11,468,544 B2
(45) Date of Patent: *Oct. 11, 2022

(54) EYE TEXTURE INPAINTING

(71) Applicant: Snap Inc., Santa Monica, CA (US)

(72) Inventors: Chen Cao, Los Angeles, CA (US);
Wen Zhang, La Jolla, CA (US);
Menglei Chai, Los Angeles, CA (US);
Linjie Luo, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/355,687

(22) Filed: Jun. 23, 2021

(65) Prior Publication Data
US 2021/0319540 A1    Oct. 14, 2021

Related U.S. Application Data

(63) Continuation of application No. 16/051,083, filed on Jul. 31, 2018, now Pat. No. 11,074,675.

(51) Int. Cl.
| | |
|---|---|
| *G06T 5/00* | (2006.01) |
| *G06T 5/50* | (2006.01) |
| *G06T 7/40* | (2017.01) |
| *G06V 40/18* | (2022.01) |

(52) U.S. Cl.
CPC ............. *G06T 5/005* (2013.01); *G06T 5/50* (2013.01); *G06T 7/40* (2013.01); *G06V 40/193* (2022.01)

(58) Field of Classification Search
CPC .. G06T 5/005; G06T 5/50; G06T 7/40; G06V 40/193; G06V 40/18
USPC .......................................................... 345/582
See application file for complete search history.

(56) References Cited

U.S. PATENT DOCUMENTS

| | | | |
|---|---|---|---|
| 9,830,708 B1 * | 11/2017 | Poliakov | .................. G06T 7/11 |
| 11,074,675 B2 | 7/2021 | Cao et al. | |
| 2003/0063794 A1 | 4/2003 | Rubinstenn et al. | |
| 2003/0118217 A1 | 6/2003 | Kondo et al. | |
| 2004/0114797 A1 | 6/2004 | Meckes | |
| 2005/0007552 A1 | 1/2005 | Fergason et al. | |
| 2009/0046165 A1 | 2/2009 | Kato | |

(Continued)

FOREIGN PATENT DOCUMENTS

| | | |
|---|---|---|
| CN | 112513875 A | 3/2021 |
| WO | WO-2020028378 A1 | 2/2020 |

OTHER PUBLICATIONS

"U.S. Appl. No. 16/051,083, Advisory Action dated Jul. 23, 2020", 5 pgs.

(Continued)

*Primary Examiner* — Jennifer Mehmood
*Assistant Examiner* — Kim Thanh T Tran
(74) *Attorney, Agent, or Firm* — Schwegman Lundberg & Woessner, P.A.

(57) ABSTRACT

Systems, devices, media, and methods are presented for generating texture models for objects within a video stream. The systems and methods access a set of images as the set of images are being captured at a computing device. The systems and methods determine, within a portion of the set of images, an area of interest containing an eye and extract an iris area from the area of interest. The systems and methods segment a sclera area within the area of interest and generate a texture for the eye based on the iris area and the sclera area.

20 Claims, 9 Drawing Sheets

(56) References Cited

U.S. PATENT DOCUMENTS

| | | | |
|---|---|---|---|
| 2010/0290668 A1* | 11/2010 | Friedman | G06V 40/19 348/78 |
| 2011/0115798 A1 | 5/2011 | Nayar et al. | |
| 2013/0083976 A1 | 4/2013 | Ragland | |
| 2013/0243332 A1 | 9/2013 | Zhu et al. | |
| 2014/0171756 A1 | 6/2014 | Waldorf et al. | |
| 2014/0247984 A1 | 9/2014 | Sarkar | |
| 2015/0304535 A1 | 10/2015 | Smits et al. | |
| 2015/0379348 A1 | 12/2015 | Whritenor et al. | |
| 2017/0236304 A1 | 8/2017 | Kempinski et al. | |
| 2018/0012401 A1* | 1/2018 | Bérard | G06T 15/04 |
| 2018/0239425 A1 | 8/2018 | Jang | |
| 2018/0276467 A1 | 9/2018 | Kaehler | |
| 2018/0286286 A1 | 10/2018 | Flamand et al. | |
| 2020/0043145 A1 | 2/2020 | Cao et al. | |

OTHER PUBLICATIONS

"U.S. Appl. No. 16/051,083, Final Office Action dated May 6, 2020", 17 pgs.

"U.S. Appl. No. 16/051,083, Non Final Office Action dated Sep. 8, 2020", 21 pgs.

"U.S. Appl. No. 16/051,083, Non Final Office Action dated Oct. 25, 2019", 18 pgs.

"U.S. Appl. No. 16/051,083, Notice of Allowance dated Apr. 14, 2021", 8 pgs.

"U.S. Appl. No. 16/051,083, Notice of Allowance dated Dec. 30, 2020", 9 pgs.

"U.S. Appl. No. 16/051,083, Response filed Jan. 20, 2020 to Non Final Office Action dated Oct. 25, 2019", 12 pgs.

"U.S. Appl. No. 16/051,083, Response filed Jun. 16, 2020 to Final Office Action dated May 6, 2020", 12 pgs.

"U.S. Appl. No. 16/051,083, Response filed Dec. 3, 2020 to Non Final Office Action dated Sep. 8, 2020", 12 pgs.

"International Application Serial No. PCT/US2019/044161, International Preliminary Report on Patentability dated Feb. 11, 2021", 12 pgs.

"International Application Serial No. PCT/US2019/044161, International Search Report dated Sep. 19, 2019", 4 pgs.

"International Application Serial No. PCT/US2019/044161, Written Opinion dated Sep. 19, 2019", 13 pgs.

Criminisi, Antonio, et al., "Region Filling and Object Removal by Exemplar-Based Image Inpainting", IEEE Transactions on Image Processing, 13(9), (Sep. 1, 2004), 1200-1212.

Guillemot, Christine, et al., "Image Inpainting : Overview and Recent Advances", IEEE Signal Processing Magazine, 31(1), (Jan. 1, 2014), 127-144.

Huang, Junzhou, et al., "Noise removal and impainting model for IRIS image", IEEE International Conference on Image Processing (ICIP) vol. 2, (Oct. 24, 2004), 869-872.

Munemoto, Taihel, et al., "Hallucinating Irises—Dealing with Partial & Occluded Iris Regions", IEEE 2nd International Conference on Biometrics: Theory, Applications and Systems, (Sep. 29, 2008), 6 pgs.

Wang, Congyi, et al., "Realtime 3D eye gaze animation using a single RGB camera", ACM Transactions on Graphics, 35(4), p. 118,(Jul. 11, 2016), 14 pgs.

* cited by examiner

EYE TEXTURE INPAINTING

CLAIM OF PRIORITY

This application is a continuation of and claims the benefit of priority of U.S. patent application Ser. No. 16/051,083, filed Jul. 31, 2018, which is herein incorporated by reference in its entirety.

TECHNICAL FIELD

Embodiments of the present disclosure relate generally to object identification and manipulation within an image stream. More particularly, but not by way of limitation, the present disclosure addresses systems and methods for identifying, modeling, and tracking objects presented within an image or video stream.

BACKGROUND

Telecommunications applications and devices can provide communication among multiple users using a variety of media, such as text, images, sound recordings, and/or video recording. For example, video conferencing allows two or more individuals to communicate with each other using a combination of software applications, telecommunications devices, and a telecommunications network. Telecommunications devices may also record video streams to transmit as messages across a telecommunications network. Often video-based telecommunications applications enable users to chat, face-to-face, over a network. Using current systems, users in video chats may have their attention directed toward a screen, thus giving an impression that users are not paying attention to one another. Some applications involving video recording enable modeling of aspects depicted within a video. Often such systems do not enable real-time modeling or real-time manipulation of video. Further, telecommunications and other computer applications utilize a user interface in which users interact with an application using physical gestures or devices, such as a mouse. These telecommunications applications are often limiting in the manner by which a user may control the application; further, they provide no way to determine what part of a user interface is receiving a user's attention.

BRIEF DESCRIPTION OF THE DRAWINGS

Various ones of the appended drawings merely illustrate example embodiments of the present disclosure and should not be considered as limiting its scope.

Figure 1:
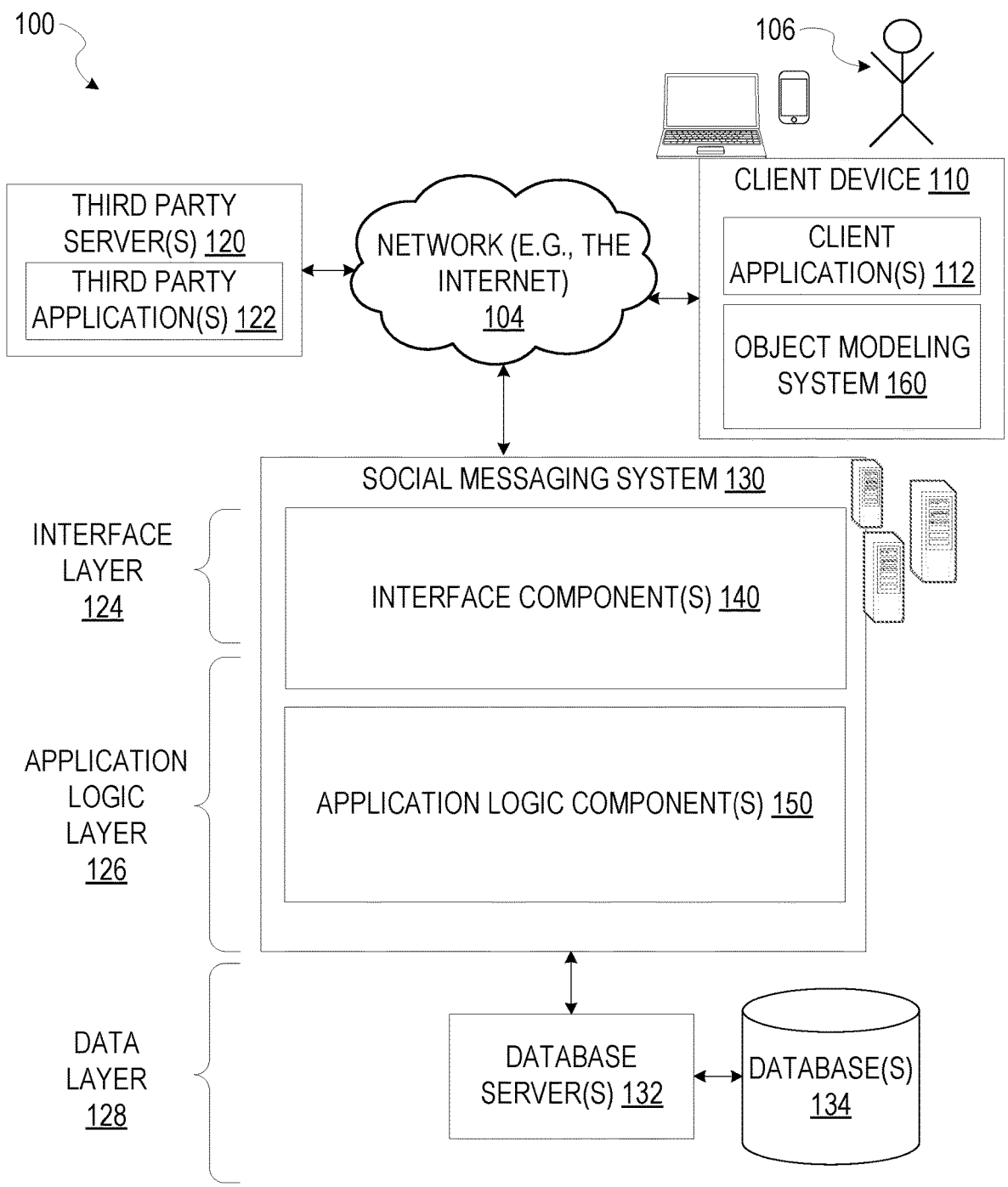
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products illustrative of embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In one aspect of the present disclosure, a user opens an application. The application accesses a camera to capture images in the camera's field of view. As an example, the camera may capture a video stream or group of images of the user's face. The systems and methods then identify objects of interest, such as the eyes of the user. The system generates a model of the eyes and tracks a gaze of the user, determining where on the user interface the user is looking. The system may then change a gaze location of the user, aspects of the object of interest (e.g., a color of the eye), aspects or characteristics of an object of interest, or be used to generate a model, avatar, or animation of the user.

In one aspect of the present disclosure, systems and methods are disclosed which enable generation of object textures and models within a video stream. The systems and methods may also be used in tracking objects within the video stream. The systems and methods described herein describe a physically-based method to generate physically accurate modeling, locating, and tracking of objects within a video stream. The systems described herein enable combination of textures or models with three-dimensional representations of objects to track and extract physical information from the video stream. For example, the methods and systems described herein enable modeling and tracking of eyes depicted on a face. As the eyes are tracked, the systems and methods described herein enable determination and tracking of a physical gaze direction. The systems and methods also enable modification of the video stream using the modeled or textured object. The present systems and methods are not limited to two-dimensional images, as some previous systems are. Further, the systems and methods described herein provide increased accuracy in object modeling and object tracking. Certain embodiments described herein provide increased accuracy in gaze detection and tracking. Some embodiments described herein enable real-time gaze tracking within a video stream, as the video stream is being captured, thus improving and moving beyond capabilities of previous systems. Similarly, some embodiments described herein enable real-time, accurate modification of objects, including gaze direction.

The above is one specific example. The various embodiments of the present disclosure relate to devices and instructions by one or more processors of a device to generate texture models for objects within a video stream and track objects. An object modeling system is described that generates object textures. The object modeling system may modify images within a video stream or set of images using generated object textures. The object modeling system may also track objects using two-dimensional models, three-dimensional models, generated object textures, and combinations thereof.

FIG. 1 is a network diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving text and media communication, determining geolocation, etc.) and aspects (e.g., transferring communications data, receiving and transmitting indications of communication sessions, etc.) associated with the network system 100 and its users. Although illustrated herein as client-server architecture, other embodiments may include other network architectures, such as peer-to-peer or distributed network environments.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each component or engine shown in FIG. 1 represents a set of executable software instructions and the corresponding hardware (e.g., memory and processor) for executing the instructions, forming a hardware-implemented component or engine and acting, at the time of the execution of instructions, as a special purpose machine configured to carry out a particular set of functions. To avoid obscuring the inventive subject matter with unnecessary detail, various functional components and engines that are not germane to conveying an understanding of the inventive subject matter have been omitted from FIG. 1. Of course, additional functional components and engines may be used with a social messaging system, such as that illustrated in FIG. 1, to facilitate additional functionality that is not specifically described herein. Furthermore, the various functional components and engines depicted in FIG. 1 may reside on a single server computer or client device, or may be distributed across several server computers or client devices in various arrangements. Moreover, although the social messaging system 130 is depicted in FIG. 1 as a three-tiered architecture, the inventive subject matter is by no means limited to such an architecture.

As shown in FIG. 1, the interface layer 124 consists of interface component(s) (e.g., a web server) 140, which receives requests from various client-computing devices and servers, such as client device 110 executing client application(s) 112, and third-party server(s) 120 executing third-party application(s) 122. In response to received requests, the interface component(s) 140 communicates appropriate responses to requesting devices via a network 104. For example, the interface component(s) 140 can receive requests such as Hypertext Transfer Protocol (HTTP) requests, or other web-based, Application Programming Interface (API) requests.

The client device 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). Further, in some example embodiments, the client device 110 forms all or part of an object modeling system 160 such that components of the object modeling system 160 configure the client device 110 to perform a specific set of functions with respect to operations of the object modeling system 160.

In an example, the client device 110 is executing the client application(s) 112. The client application(s) 112 can provide functionality to present information to a user 106 and communicate via the network 104 to exchange information with the social messaging system 130. Further, in some examples, the client device 110 executes functionality of the object modeling system 160 to generate texture models for objects within a video stream and track objects.

Each client device 110 can comprise a computing device that includes at least a display and communication capabilities with the network 104 to access the social messaging system 130, other client devices, and third-party server(s) 120. Client devices 110 comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. User 106 can be a person, a machine, or other means of interacting with the client device 110. In some embodiments, the user 106 interacts with the social messaging system 130 via the client device 110. The user 106 may not be part of the network system 100, but may be associated with the client devices 110.

As shown in FIG. 1, the data layer 128 has database server(s) 132 that facilitate access to information storage repositories or database(s) 134. The database(s) 134 are storage devices that store data such as member profile data, social graph data (e.g., relationships between members of the social messaging system 130), image modification preference data, accessibility data, and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic components 150, which, in conjunction with the interface component(s) 140, generate various user interfaces with data retrieved from various data sources or data services in the data layer 128. Individual application logic components 150 may be used to implement the functionality associated with various applications, services, and features of the social messaging system 130. For instance, a social messaging application can be implemented with at least a portion of the application logic components 150. The social messaging application provides a messaging mechanism for users of the client devices 110 to send and receive messages that include text and media content such as pictures and video. The client devices 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application logic components 150.

As illustrated in FIG. 1, the social messaging system 130 may include at least a portion of the object modeling system 160 capable of generating texture models for objects within a video stream and tracking objects. Similarly, the client device 110 includes at least a portion of the object modeling system 160, as described above. In other examples, client device 110 may include the entirety of the object modeling system 160. In instances where the client device 110 includes a portion of (or all of) the object modeling system 160, the client device 110 can work alone or in cooperation with the social messaging system 130 to provide the functionality of the object modeling system 160 described herein.

In some embodiments, the social messaging system 130 may be an ephemeral message system that enables ephemeral communications where content (e.g., video clips or images) are deleted following a deletion trigger event such as a viewing time or viewing completion. In such embodiments, a device uses the various components described herein within the context of any of generating, sending, receiving, or displaying aspects of an ephemeral message. For example, a device implementing the object modeling system 160 may generate texture models for objects within a video stream and track objects. The device may generate texture models for objects within a video stream and track objects as a part of a generation of content for an ephemeral message, a messaging application, an entertainment application, a teleconference application, an augmented reality application, or any other suitable application.

Figure 2:
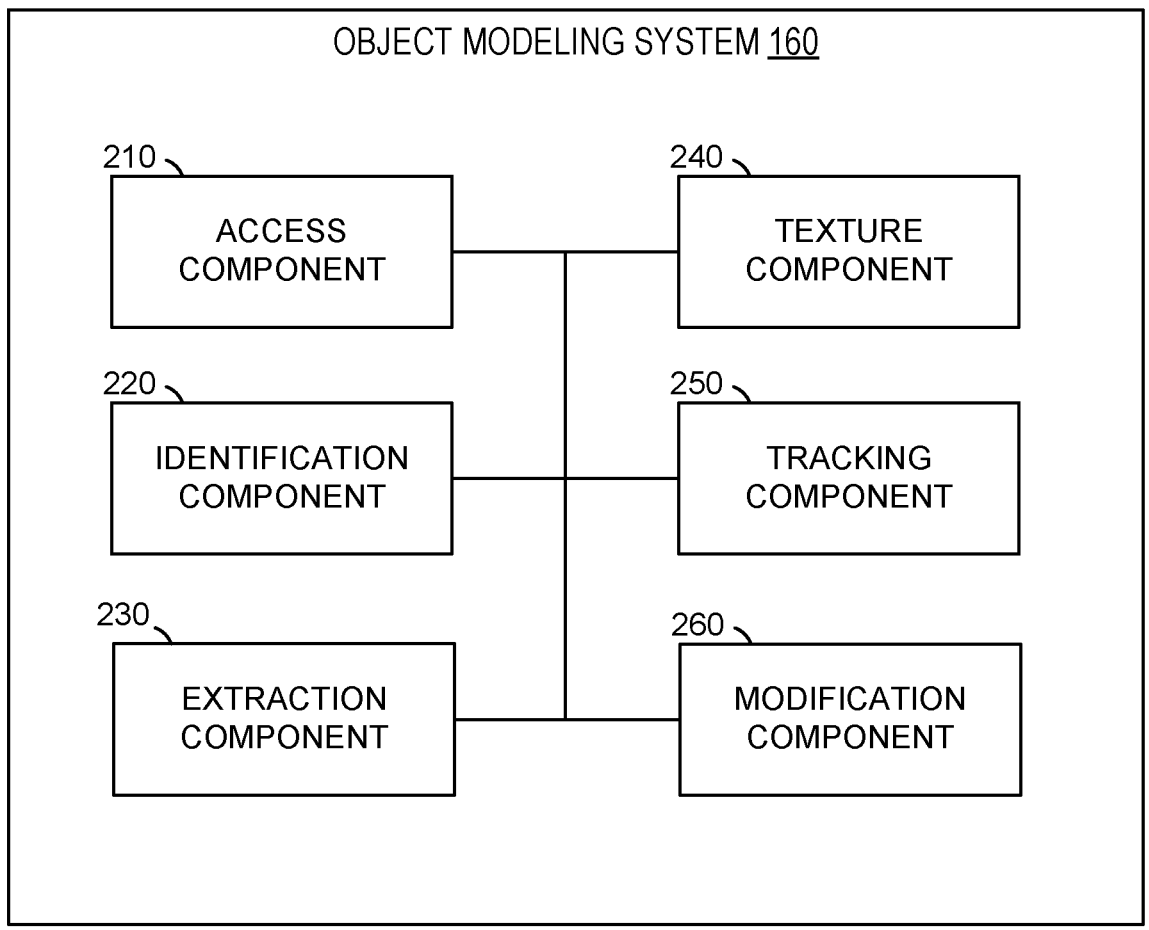
FIG. 2 is a diagram illustrating an object modeling system, according to some example embodiments.

In FIG. 2, in various embodiments, the object modeling system 160 can be implemented as a standalone system or implemented in conjunction with the client device 110, and is not necessarily included in the social messaging system 130. The object modeling system 160 is shown to include an access component 210, an identification component 220, an extraction component 230, a texture component 240, a tracking component 250, and a modification component 260. All, or some, of the components 210-260, communicate with each other, for example, via a network coupling, shared memory, and the like. Each component of components 210-260 can be implemented as a single component, combined into other components, or further subdivided into multiple components. Other components not pertinent to example embodiments can also be included, but are not shown.

Figure 3:
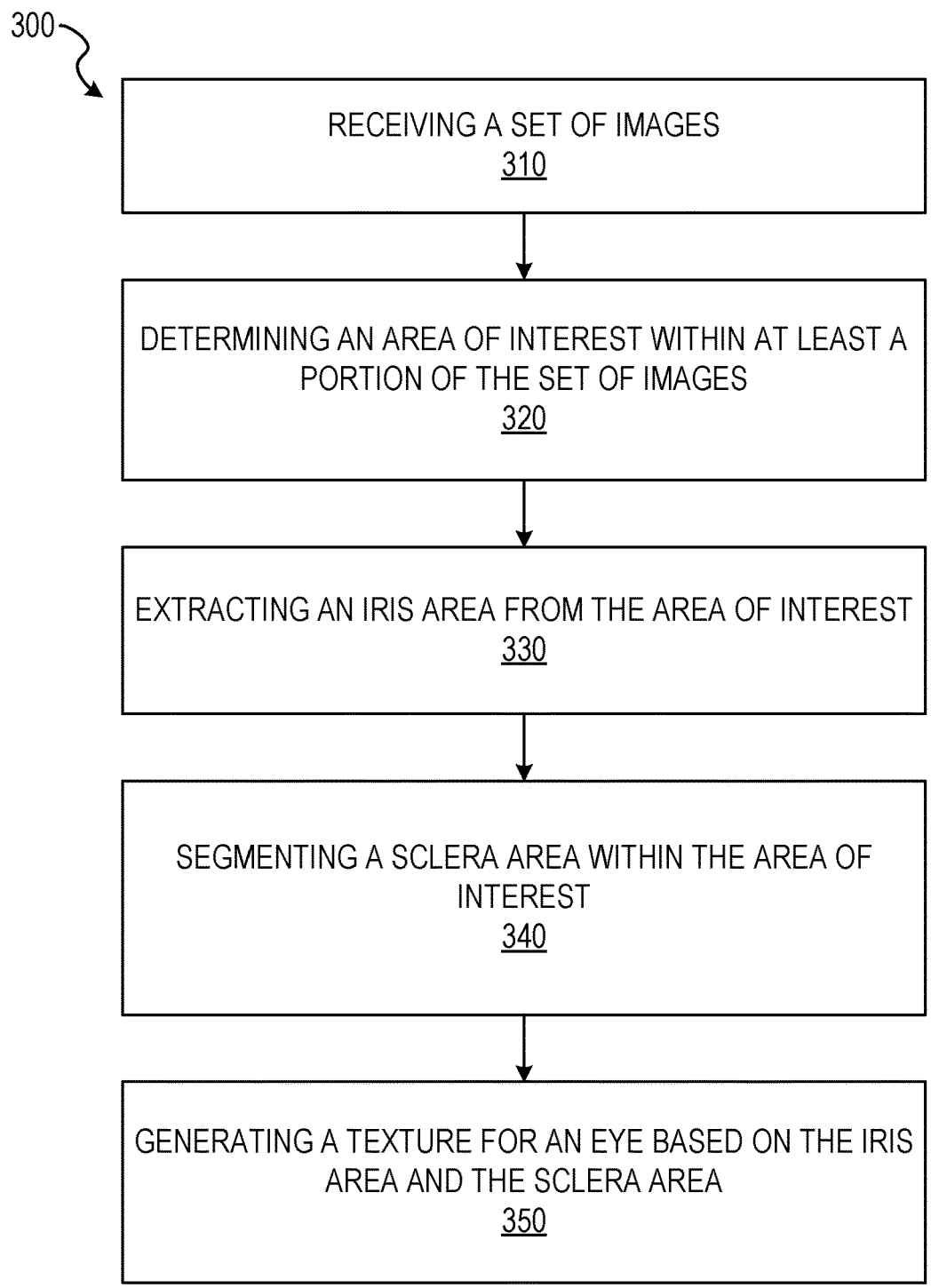
FIG. 3 is a flow diagram illustrating an example method for generating texture models for objects within a video stream, according to some example embodiments.

FIG. 3 depicts a flow diagram illustrating an example method 300 for generating texture models for objects within a video stream, according to some example embodiments. The operations of method 300 may be performed by components of the object modeling system 160, and are so described below for purposes of illustration.

In operation 310, the access component 210 receives or otherwise accesses a set of images. At least a portion of the set of images may depict at least a portion of a face. The access component 210 may access the set of images as the images are being captured at a computing device. In some embodiments, the access component 210 receives the one or more images as a video stream captured by an image capture device associated with the client device 110 and presented on a user interface of an application. The access component 210 may include the image capture device as a portion of hardware comprising the access component 210. In these embodiments, the access component 210 directly receives the one or more images or the video stream captured by the image capture device. In some instances, the access component 210 passes all or a part of the one or more images or the video stream (e.g., a set of images comprising the video stream) to one or more components of the object modeling system 160, as described below in more detail.

In operation 320, the identification component 220 determines an area of interest within at least a portion of the set of images. In some embodiments, the identification component 220 determines an area of interest containing an eye or a pair of eyes depicted on a face within the set of images. In some embodiments, the identification component 220 determines the area of interest using facial landmark tracking. The area of interest may be associated with a specified feature, characteristic, or attribute of the face. For example, the identification component 220 may determine a specified feature to be identified is an eye. The identification component 220 may identify one or more facial landmarks, within at least a portion of images of the set of images, associated with an eye. The identification component 220 may then determine an area surrounding the one or more facial landmarks associated with the eye. In some embodiments, the identification component 220 determines the area of interest as a portion of one or more images surrounding a plurality of features, characteristics, or attributes depicted on an object (e.g., a face). For example, the identification component 220 may determine the area of interest as a portion of the face surrounding both eyes, both eyebrows, both lips, specified wrinkles, combinations thereof, or any other suitable features. Similarly, the identification component 220 may determine an area of interest on an object other than a face, such as a label on a soda can, features of an animal, features of an automobile, or any other features, characteristics, or aspects of a suitable object depicted within at least a portion of the set of images.

In operation 330, the extraction component 230 extracts a portion of the area of interest or an object within the area of interest. The extraction component 230 may extract the portion of the area of interest on an object within the area of interest by segmenting the portion of the area of interest and disregarding, at least temporarily, the remaining portions of the area of interest. In some embodiments, the extraction component 230 extracts an iris area from the area of interest. The iris area may correspond to at least one iris depicted in at least a portion of the set of images.

In some instances, the extraction component 230 extracts the portion of the area of interest (e.g., the iris area) by selecting a portion of the area of interest proximate to an outline, edge, or other border of a desired object (e.g., the iris within an eye). Prior to, during, or after (e.g., after an initial identification or extraction), the extraction component 230 may identify one or more obscured, obstructed, or otherwise hidden portions of the object within the portion of the area of interest. The extraction component 230 may determine visible sections of the object which correspond to the obscured portions and translate one or more color, texture, pattern, or other visual aspects from the visible sections to the obscured portions. Once visual aspects are translated, the extraction component 230 may extract a completed object or portion of the area of interest. The extraction component 230 may then revert modifications made to the obscured portion of the object.

In operation 340, the extraction component 230 segments an area of the area of interest. The segmented area of the area of interest may be a portion or section of the area of interest surrounding the extracted portion of the area of interest described above with respect to operation 330. In some embodiments, the extraction component 230 segments a sclera area within the area of interest. The sclera area may correspond to a sclera of at least one eye depicted in at least a portion of the set of images.

Where the segmented area is a sclera, the extraction component 230 segments the sclera area by determining a portion of the area of interest corresponding to the sclera. In some embodiments, the extraction component 230 determines the sclera by identifying an initial color distribution within the area of interest. The extraction component 230 may identify edges extending between color areas having a substantially similar initial color distribution. For example, the extraction component 230 may identify a first color area having a skin tone (e.g., eyelids within the area of interest), a second color area having an iris tone (e.g., an iris or pupil within the area of interest), and a third color area having an initial color distribution within a range suitable for the sclera of an eye. The extraction component 230 may determine edges extending between the first color area, the second color area, and the third color area. The edges may represent color boundaries.

The extraction component 230 then determines or calculates a final color distribution for the sclera area. The final color distribution may determine a prevailing color for the sclera area and one or more color variations for the sclera area. The prevailing color may be varying shades or hues of white and the color variations may include red shades or hues (e.g., veins) and other variations common to human sclera. In some instances, the prevailing color and the color variations may be generated as a color histogram (e.g., RGB). The extraction component 230 may then pass the sclera area, and color distribution of the sclera area, to the texture component 240. The texture component 240 may then match color channels of the color histogram for generating the sclera texture.

In operation 350, the texture component 240 generates a texture for an object within the area of interest based on the portion of the area of interest extracted in operation 330 and the area of the area of interest extracted in operation 340. In some embodiments, the texture component 240 generates a texture for the eye based on the iris area and the sclera area. The texture component 240 may generate the texture by combining colors and textures of the iris area and the sclera area. In some embodiments, the texture component 240 generates the texture by matching the sclera area to a sclera template from a set of sclera templates or a set of eye templates including sclera textures. The texture component 240 may then generate the texture by modifying an iris area of the eye template to match a color, color distribution, or texture of the iris texture for the iris area extracted in operation 330. In such embodiments, the texture component 240 may generate the texture by modifying a preexisting texture model. Whether generating the texture or modifying a texture template or model, the texture component 240 generates the texture to match the attributes and characteristics of the iris, the sclera, and the pupil.

In some embodiments, the texture component 240 generates the eye texture by generating an iris texture for the iris area. The texture may be based on at least one or more color patches selected from the iris area. The iris texture may include the iris area and color patches mapped to obscured portions of the iris. In some embodiments, the texture component 240 generates the iris texture from the actual iris area. The texture component 240 may also generate the iris texture by matching or approximating the color and color variations of the iris area to an iris template selected from a set of iris templates.

The texture component 240 may select a sclera texture from a set of predetermined sclera textures. The sclera texture may be selected based on a color distribution of the sclera area. In some embodiments, the texture component 240 selects the sclera texture by matching or approximating one or more of the prevailing color, the one or more color variations, or combinations thereof of the sclera area to a sclera template. The sclera template may be selected from a set of sclera templates generated prior to receiving the set of images. In some embodiments, the texture component 240 performs an initial match of the sclera area to a subset of sclera templates of the set of sclera templates based on the prevailing color of the color distribution of the sclera area. The texture component 240 may then select the sclera texture as a sclera template, of the subset of sclera templates, matching or approximating the one or more color variations or patterns within the one or more color variations of the sclera area.

The texture component 240 may blend an edge of the iris texture with a portion of the sclera texture proximate to the iris area. The texture component 240 may blend the edge of the iris texture while changing the iris area from a color coordinate or set of color coordinate values to an image coordinate or set of image coordinate values. The texture component 240 may blend colors of the iris texture and the sclera texture at an intersection where the two textures meet. In some embodiments, a threshold (e.g., a dynamic or predefined pixel distance) may be blended on each of the iris texture and the sclera texture to remove a sharp edge surrounding the iris texture for a more realistic eye texture. The texture may be accurate and appear natural or realistic when positioned within the set of images and replacing the eyes of a face depicted within the set of images. The texture may also be inserted into a digital avatar, animation, or other representation of a person or animal. Although described with respect to a set of images, in some embodiments, the texture may be generated from a single image. The single image and texture may be used to make a digital avatar which may be animated based on models and textures generated from the face, as described above. Further, the texture may be modified to change colors (e.g., eye color or sclera color), dimensions or proportions (e.g., shape and size), or any other suitable modeled or textured characteristics or attributes.

Figure 4:
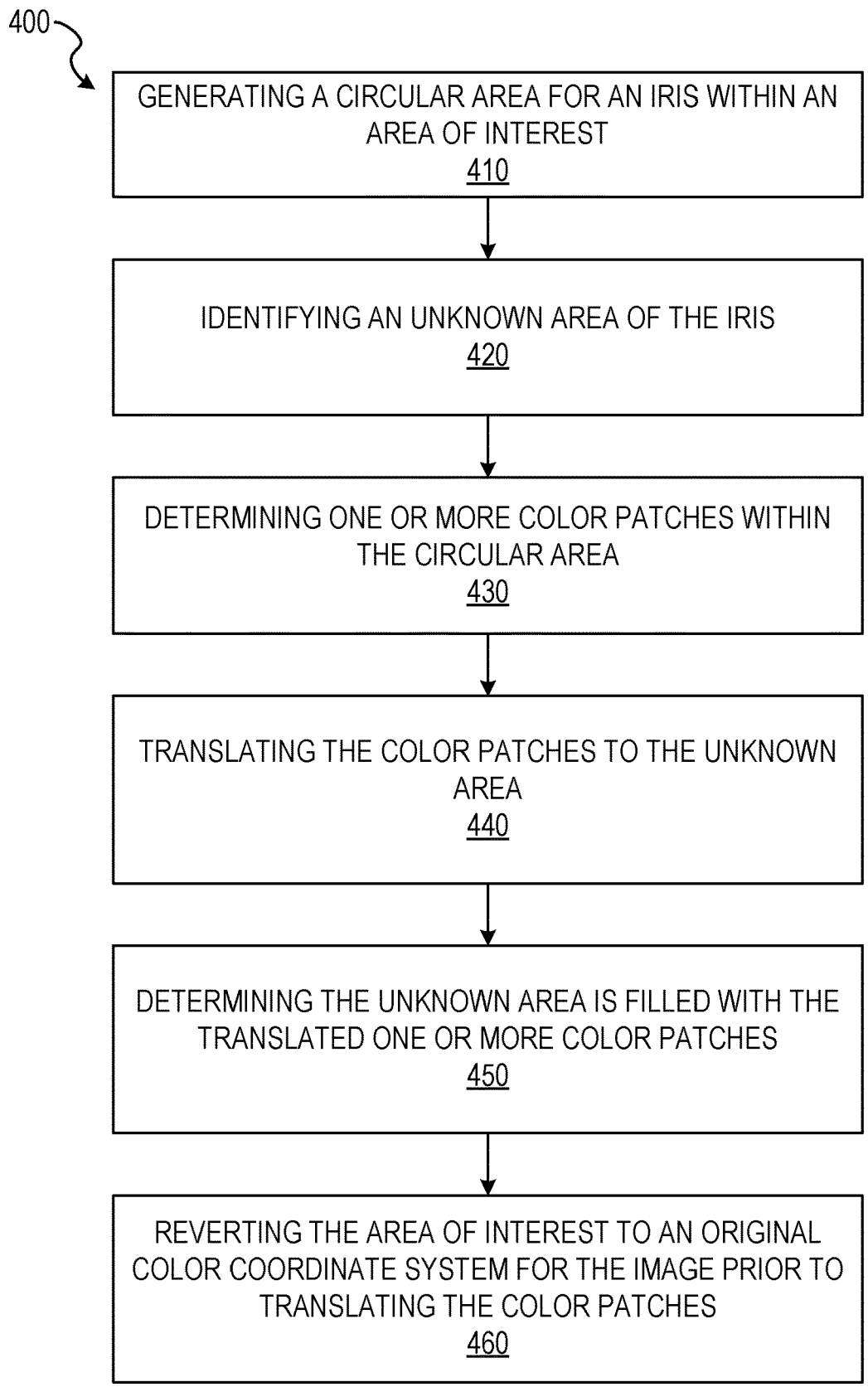
FIG. 4 is a flow diagram illustrating an example method for generating texture models for objects within a video stream, according to some example embodiments.

FIG. 4 depicts a flow diagram illustrating an example method 400 for generating texture models for objects within a video stream, according to some example embodiments. The operations of method 400 may be performed by components of the object modeling system 160. In some instances, certain operations of the method 400 may be performed using one or more operations of the method 300 or as sub-operations of one or more operations of the method 300, as will be explained in more detail below. For example, at least a portion of the operations of method 400 may be performed as part of or in response to execution of operation 330 of method 300, described above.

In operation 410, the extraction component 230 generates a circular area for the iris within the area of interest. The circular area may be generated as a circular outline. The circular outline may be positioned around the iris in the area of interest. In some instances, the circular area is an approximation of a circle. For example, the circular area may be elliptical, oval, or other outline similar to a circle.

In some embodiments, the extraction component 230 generates the circular area by identifying at least a portion of an edge of the iris within the area of interest. The extraction component 230 may determine a circular shape. The circular shape may be sized based on the portion of the edge of the iris. In some embodiments, the extraction component determines one or more of a diameter or a circumference of the iris. The circumference may be determined based on an estimated area of the iris, including a portion of the iris which may be obscured by one or more eyelids. The extraction component 230 may determine the diameter or circumference (e.g., iris measurement) in any suitable unit of measurement (e.g., millimeters, inches, pixels, etc.). The extraction component 230 may then generate a circular shape with dimensions or measurements matching or approximating the iris measurement.

The extraction component 230 may align the circular shape with the portion of the edge of the iris. In some embodiments, the extraction component 230 may move the circular shape within the area of interest, such that at least a portion of the circular shape intersects or touches the iris area. The extraction component 230 may also resize or otherwise change one or more of a size, shape, or dimension of the circular shape within the area of interest, such that at least a portion of the circular shape intersects or touches the iris area. In some embodiments, the extraction component 230 aligns the circular shape with portions of the iris unobscured by the eyelids. The extraction component 230 may also convert a coordinate system for the iris area into a polar coordinate system, taking a center of the iris area as an origin. The extraction component 230 may then extract or segment the portion of the area of interest contained within the aligned circular shape.

In operation 420, the extraction component 230 identifies an unknown area of the iris. The unknown area may correspond to a portion of the iris obstructed by an eyelid of the eye. In some embodiments, the extraction component 230 identifies the unknown area by determining one or more color areas within the circular shape or segmented iris area. The extraction component 230 may then compare the color areas to colors associated with one or more of a set of iris colors and a set of eyelid colors. The extraction component 230 may identify the unknown area of the iris as portions of the iris area having a color matching or approximating an eyelid color. In some embodiments, the extraction component 230 identifies portions of the iris area having a color matching or approximating an iris color of the set of iris colors. Portions of the iris area not matching or approximating the iris color, or a pupil color, may be selected or otherwise identified as unknown areas of the iris.

In operation 430, the extraction component 230 determines one or more color patches within the circular area. The one or more color patches may correspond to a colored portion of the iris. In some embodiments, the extraction component 230 selects the one or more color patches which match or approximate an iris color, fail to match or approximate an eyelid color, have values (e.g., hue, saturation, or color values) within a specified range of color values, or are otherwise identified as portions of the iris. The extraction component 230 may sample the one or more color patches using square areas, circular areas, elliptical areas, or any other suitable shape to capture one or more colors present in the iris.

In operation 440, the extraction component 230 translates the color patches to the unknown area. In some embodiments, the extraction component 230 translates the color patches to the unknown area by replication, copy and paste, or other color translations to replicate the color of the iris onto the unknown area within the iris area. In some embodiments the extraction component 230 uses a patch match inpainting algorithm to translate the iris color to the unknown areas. For example, the extraction component 230 may determine similar regions, within the unknown areas, to translate the color patches. The extraction component 230 may then cover part of the similar region with a color patch. The color patch may be a color or colors selected from the iris and covering a defined shape or dimension (e.g., a circular or square patch of color having a predefined or dynamic pixel dimension).

The extraction component 230 may cover the unknown area with one or more color patches. In some embodiments, the extraction component 230 may cycle between a plurality of color patches to cover the unknown area, replicate a single color patch, match specified regions of the unknown area to a single or multiple color patch, combinations thereof, or any other suitable inpainting method or algorithm. For example, the extraction component 230 may cover portions of the unknown area with color patches selected from areas of the iris proximate to the unknown area, color patches positioned opposite of the unknown area, or color patches having similar statistics to or around the unknown area. The translation may be performed by mapping image locations to a color coordinate system prior to translation. The extraction component 230 may then match locations, within the set of images, for the unknown area with color patches used to inpaint portions of the unknown area.

In operation 450, the extraction component 230 determines whether the unknown area is filled with the translated one or more color patches. The extraction component 230 may determine that the unknown area is filled by determining no additional portions of the iris area match the eyelid color. In some embodiments, the extraction component 230 determines that the unknown area is filled by identifying image locations for the unknown area. The extraction component 230 may then determine that each of the image locations associated with the unknown area has a color, translated from the iris area, that replaces an original color. Although described with certain embodiments or examples, it should be understood that the extraction component 230 may determine that the unknown area is filled using any suitable metric, means, or algorithm.

In operation 460, the extraction component 230 reverts the area of interest to an original color coordinate system for the image prior to translating the color patches. In some embodiments, the extraction component 230 may discard a portion of the extracted iris area, retaining data or metadata representing dimensions, colors, and placement of the iris. The extraction component 230 may pass the representative data to one or more components to perform tracking or modification of the set of images using the extracted iris or representative data. In some embodiments, the extraction component 230 reverts the area of interest to the original color coordinate system and image coordinate system, while retaining a mapping of the color patch inpainting and the image locations for the color patch inpainting.

Figure 5:
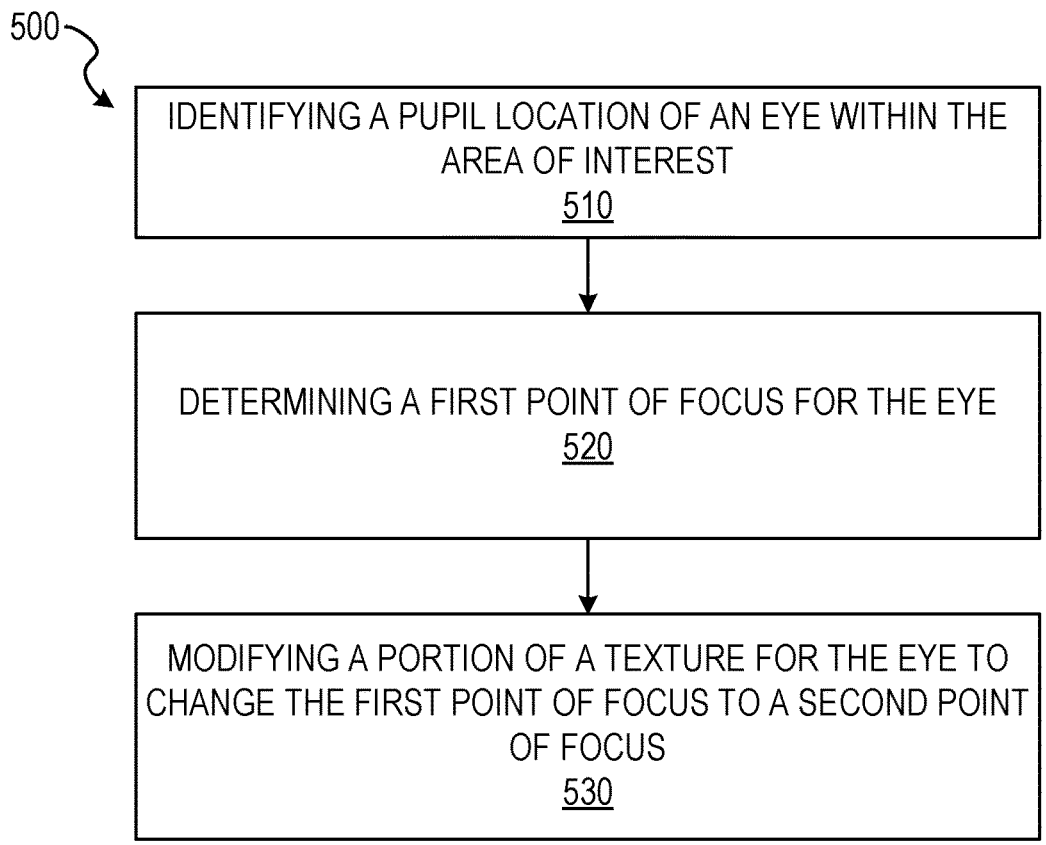
FIG. 5 is a flow diagram illustrating an example method for tracking a texture model of an object within a video stream, according to some example embodiments.

FIG. 5 depicts a flow diagram illustrating an example method 500 for tracking a texture model of an object within a video stream. The operations of method 500 may be performed by components of the object modeling system 160. In some instances, certain operations of the method 500 may be performed using one or more operations of the method 300 or the method 400 or as sub-operations of one or more operations of the method 300 or the method 400, as will be explained in more detail below. For example, operations of the method 500 may be performed within or after at least a portion of the operations of methods 300 or 400.

In operation 510, the tracking component 250 identifies a point within the area of interest. In some embodiments, the tracking component 250 identifies the point as a pupil location within the area of interest. In some embodiments, the pupil location is determined based on the iris area and the sclera area. The tracking component 250 may determine the pupil location as a center point within the iris area or a center point within a blackened portion of the iris area.

In operation 520, the tracking component 250 determines a first point of focus for the eye. In some embodiments, the first point of focus is based on the pupil location. The tracking component 250 may determine the first point of focus based on the pupil location and a distance of the pupil location from one or more point within the sclera area. For example, the tracking component 250 may determine the first point of focus based on a position of the pupil location relative to a left corner or right corner of the eye based on an edge of the sclera area. The tracking component 250 may also determine the first point of focus based on one or more facial landmarks. For example, the tracking component 250 may determine the first point of focus based on one or more corners of the eye, one or more points along the eyelid, one or more points associated with a nose, one or more points associated with a mouth, one or more points associated with the eyebrows, combinations thereof, or any other suitable facial landmark present in at least a portion of images of the set of images.

In operation 530, the modification component 260 modifies a portion of the texture for the eye to change the first point of focus to a second point of focus. In some embodiments, the second point of focus is directed to a position different than that of the first point of focus. The modification component 260 may replace at least a portion of one or more of the pupil, the iris, and the sclera with the texture generated in operation 350 of method 300, described above. In some embodiments, the modification component 260 replaces the entire eye with the eye texture generated in operation 350. The eye texture may then be directed to the second point of focus independent of the face or in cooperation with a direction, attitude, angle, or other orientation of the face. The eye texture may also be used to adjust for occlusions.

The texture replacing the portion of the pupil, iris, and sclera may have a pupil with a center point positioned at a different image location than the point identified in operation 510. For example, where the face appears in a teleconference and the first point of focus is directed at a screen instead of a camera, the modification component 260 may replace at least a portion, or the entirety, of the eye to adjust the point of focus from the first point of focus to the second point of focus, such that the eyes within the set of images appear to be directed toward the camera capturing the face of the teleconference participant. Similarly, in a messaging, entertainment, or avatar generation component, the modification component 260 may modify the eye, using the texture generated in operation 350, to appear as looking at an augmented reality element depicted on a user interface, a character appearing in a video stream, a portion of a video game, or any other suitable direction.

Figure 6:
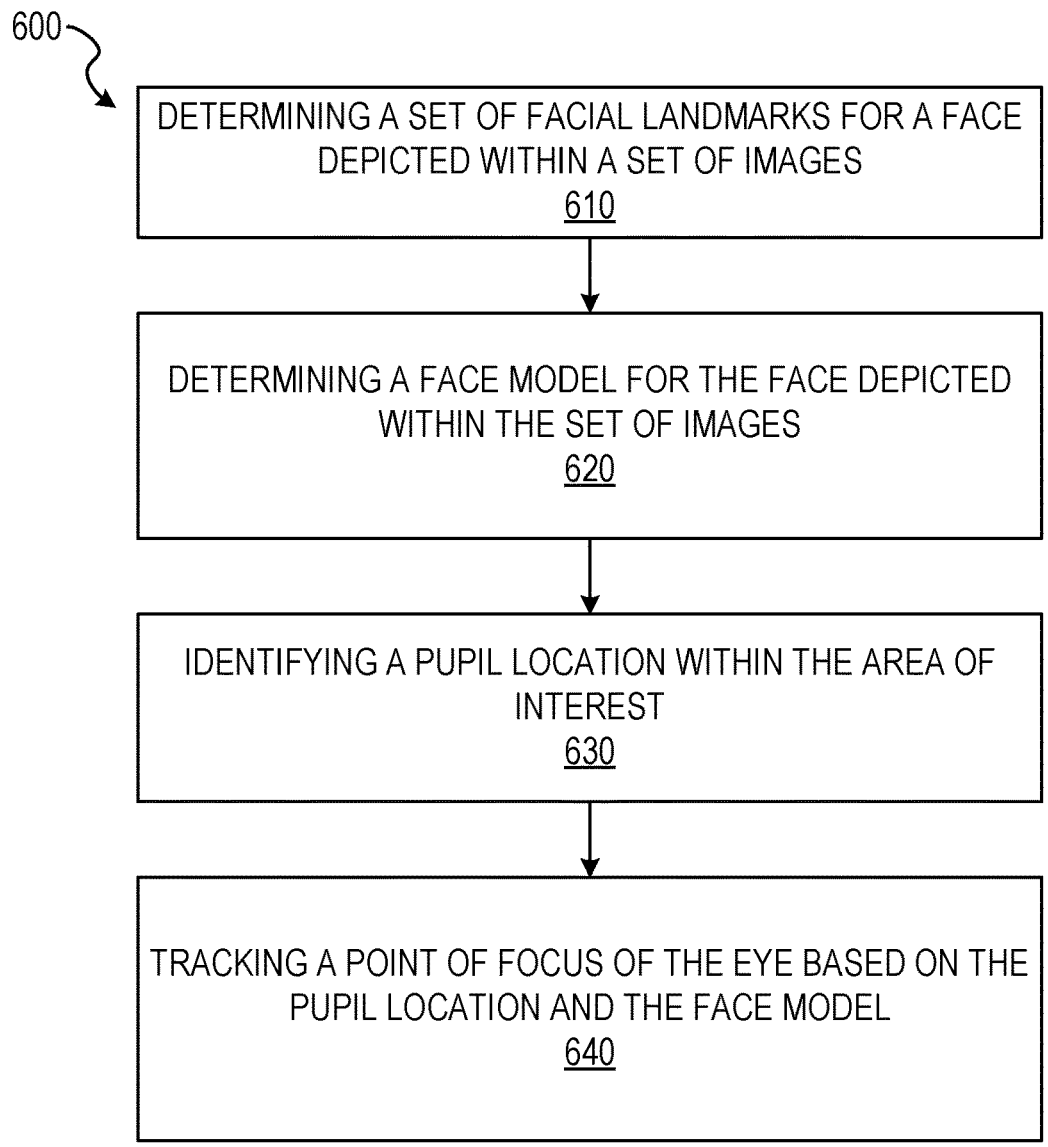
FIG. 6 is a flow diagram illustrating an example method for tracking a texture model of an object within a video stream, according to some example embodiments.

FIG. 6 depicts a flow diagram illustrating an example method 600 for tracking a texture model of an object within a video stream, according to some example embodiments.

The operations of method 600 may be performed by components of the object modeling system 160. In some instances, certain operations of the method 600 may be performed using one or more operations of the method 300, the method 400, or the method 500 or as sub-operations of one or more operations of one or more of the methods 300, 400, or 500, as will be explained in more detail below. For example, operations of the method 600 may be performed as part of the operations or sub-operations of the method 600. Operations of the method 600 may also be performed within or after at least a portion of the operations of methods 300 or 400.

In operation 610, the tracking component 250 determines a set of facial landmarks for a face depicted within the set of images. In some embodiments, the tracking component 250 determines the set of facial landmarks by identifying a face within the set of images, described above in operation 310. The tracking component 250 may identify known facial landmarks on the face within the set of images. For example, known facial landmarks may include corner points for eyes, one or more points on a nose, one or more points on a mouth, one or more points on an eyebrow, one or more points on a jaw, combinations thereof, and any other suitable facial landmarks points. The facial landmark points may be one or more points, pixels, characteristics, attributes, features, or other elements depicted within a face which may be used to distinguish one face from another. In some embodiments, the tracking component 250 determines facial landmark points, on the face within the set of images, which are commonly used in facial tracking or facial analysis operations, algorithms, or programs. In some embodiments, the facial landmarks (e.g., known facial landmarks and relative positions of the landmarks) may be received as input to the tracking component 250. The tracking component 250 may then align or identify the facial landmarks to the face within the set of images.

In operation 620, the tracking component 250 determines a face model for the face depicted within the set of images. In some embodiments, the face model has a three-dimensional representation of the eyes. In some embodiments, the three-dimensional face model may be a mesh representing three-dimensional positions of facial landmarks for a human face. In some embodiments, the tracking component 250 may take the mesh (e.g., three-dimensional face model) as input along with the facial landmarks and the set of images. The face model may be aligned with at least a portion of the set of facial landmarks for the face. In some embodiments, the tracking component 250 aligns points on the mesh with facial landmarks in a common plane or proximate to facial landmark points. For example, the tracking component 250 may align points of the mesh for facial landmark points for corners of the eyes within the set of images.

The mesh may be used to locate and initiate generation of an eyeball model. For example, the mesh may be used to augment (e.g., provide a three-dimensional aspect) to the texture generated in operation 350, described above. In some embodiments, the texture component selects 240 one or more vertices of the mesh, identifies one or more points representing biometric information for the eyes depicted within the set of images, and scales the texture to one or more of the facial landmarks and the vertices of the mesh.

In operation 630, the tracking component 250 identifies a pupil location within the area of interest. The pupil location may be determined based on the iris area and the sclera area. In some embodiments, the tracking component 250 identifies the pupil location as a two-dimensional location of the pupil (e.g., a center point within the pupil within the iris area) within the set of images. The tracking component 250 may then draw or identify a line from the pupil location to a center of a camera capturing the set of images. The line may be identified using Equation 1: $Ax+By+C=0$. In some embodiments, the line passes through the mesh and is aligned based on relative positions of one or more points on the mesh, one or more facial landmark points, and a center of the field of view of the camera. The tracking component 250 may draw the line based on an alignment of the mesh and the facial landmarks with a coordinate system within the field of view of the camera. In some instances, the tracking component 250 may use relative locations of facial landmark points to check a result of the line on a two-dimensional plane. The tracking component 250 may then link the line to a center of a three-dimensional representation of the eye (e.g., the texture generated in operation 350 and modified using the mesh). Coordinates of the line may then be converted to angular coordinates, based on the three-dimensional texture for the eye.

In some embodiments, the tracking component 250 uses the line equation (e.g., Equation 1) in combination with an eye equation, Equation 2: $(x-x_c)^2+(y-y_c)^2+(z-z_c)^2=R^2$. In Equation 2, $x_c$, $y_c$, and $z_c$ represent a center of the eye and R represents a radius of the eye. Solving Equations 1 and 2 gives a coordinate for an intersection. The coordinate of the intersection may be used to compute gaze direction. The gaze direction may be calculated relative to a field of view of the camera used to capture the set of images.

In operation 640, the tracking component 250 tracks a point of focus of the eye based on the pupil location and the face model. In some embodiments, the point of focus is tracked on a per frame basis. The tracking component 250 tracks a gaze of the eyes (e.g., the point of focus for each eye), within a three-dimensional space, for each frame in which the eyes are present. For example, when the eyes are obscured (e.g., blinking eyelids), the tracking component 250 may not track a point of focus or calculate a gaze direction. In some embodiments, gaze direction may be modified by the modification component 260. The gaze direction may also be tracked to determine portions of a user interface at which a user is directing attention. In some embodiments, gaze direction may be used to control operation of a user interface, identify areas of interest to the user, and other suitable applications.

Modules, Components, and Logic

Certain embodiments are described herein as including logic or a number of components, modules, or mechanisms. Components can constitute hardware components. A "hardware component" is a tangible unit capable of performing certain operations and can be configured or arranged in a certain physical manner. In various example embodiments, computer systems (e.g., a standalone computer system, a client computer system, or a server computer system) or hardware components of a computer system (e.g., at least one hardware processor, a processor, or a group of processors) is configured by software (e.g., an application or application portion) as a hardware component that operates to perform certain operations as described herein.

In some embodiments, a hardware component is implemented mechanically, electronically, or any suitable combination thereof. For example, a hardware component can include dedicated circuitry or logic that is permanently configured to perform certain operations. For example, a hardware component can be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component can include software encompassed within a general-purpose processor or other programmable processor. It will be appreciated that the decision to implement a hardware component mechanically, in dedicated and permanently configured circuitry, or in temporarily configured circuitry (e.g., configured by software) can be driven by cost and time considerations.

Accordingly, the phrase "hardware component" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented component" refers to a hardware component. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software can accordingly configure a particular processor or processors, for example, to constitute a particular hardware component at one instance of time and to constitute a different hardware component at a different instance of time.

Hardware components can provide information to, and receive information from, other hardware components. Accordingly, the described hardware components can be regarded as being communicatively coupled. Where multiple hardware components exist contemporaneously, communications can be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component performs an operation and stores the output of that operation in a memory device to which it is communicatively coupled. A further hardware component can then, at a later time, access the memory device to retrieve and process the stored output. Hardware components can also initiate communications with input or output devices, and can operate on a resource (e.g., a collection of information).

The various operations of example methods described herein can be performed, at least partially, by processors that are temporarily configured (e.g., by software) or permanently configured to perform the relevant operations. Whether temporarily or permanently configured, such processors constitute processor-implemented components that operate to perform operations or functions described herein. As used herein, "processor-implemented component" refers to a hardware component implemented using processors.

Similarly, the methods described herein can be at least partially processor-implemented, with a particular processor or processors being an example of hardware. For example, at least some of the operations of a method can be performed by processors or processor-implemented components. Moreover, the processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via appropriate interfaces (e.g., an Application Program Interface (API)).

The performance of certain of the operations may be distributed among the processors, not only residing within a single machine, but deployed across a number of machines. In some example embodiments, the processors or processor-implemented components are located in a single geographic location (e.g., within a home environment, an office environment, or a server farm). In other example embodiments, the processors or processor-implemented components are distributed across a number of geographic locations.

Applications

Figure 7:
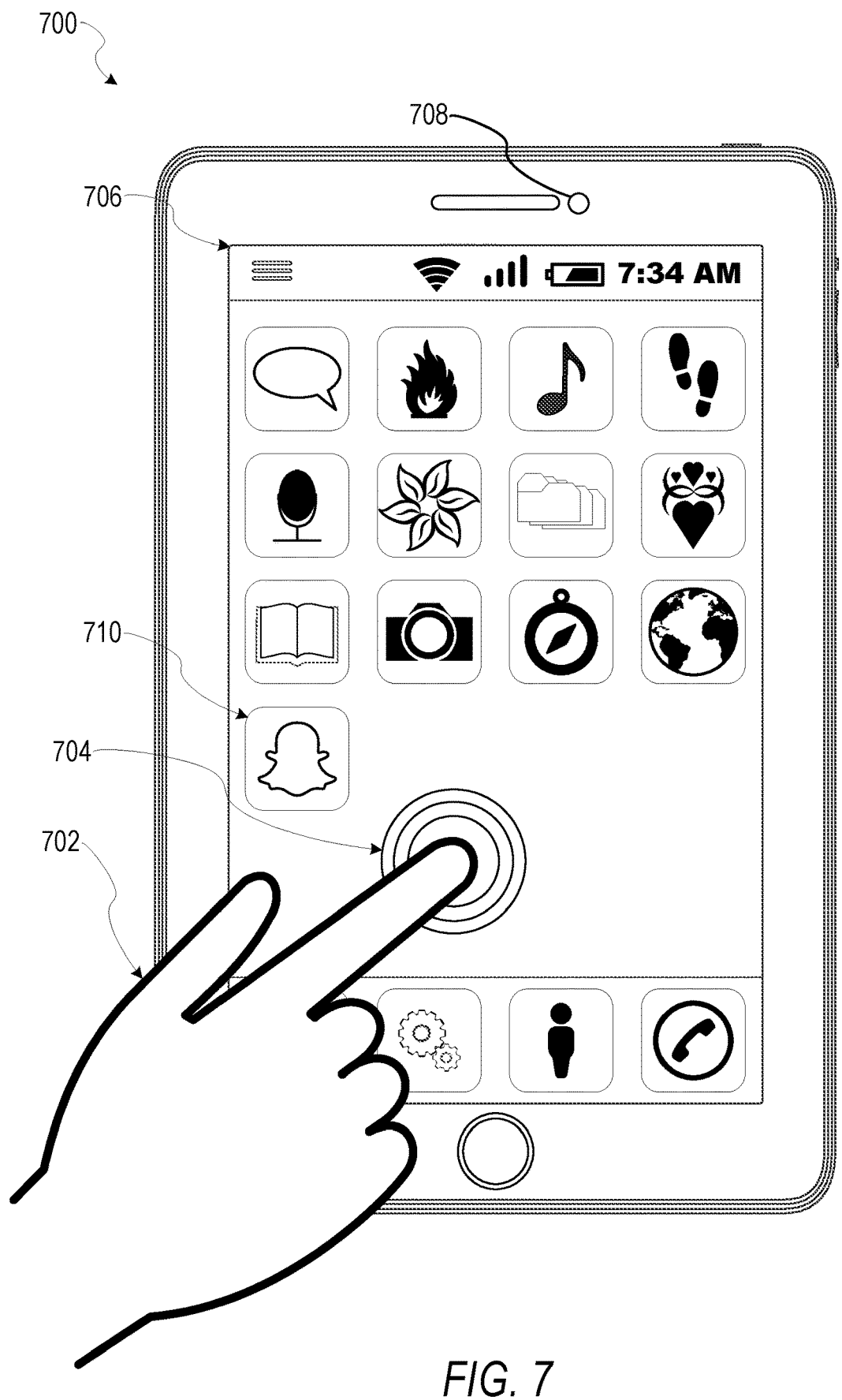
FIG. 7 is a user interface diagram depicting an example mobile device and mobile operating system interface, according to some example embodiments.

FIG. 7 illustrates an example mobile device 700 executing a mobile operating system (e.g., IOS™, ANDROID™, WINDOWS® Phone, or other mobile operating systems), consistent with some embodiments. In one embodiment, the mobile device 700 includes a touch screen operable to receive tactile data from a user 702. For instance, the user 702 may physically touch 704 the mobile device 700, and in response to the touch 704, the mobile device 700 may determine tactile data such as touch location, touch force, or gesture motion. In various example embodiments, the mobile device 700 displays a home screen 706 (e.g., Springboard on IOS™) operable to launch applications or otherwise manage various aspects of the mobile device 700. In some example embodiments, the home screen 706 provides status information such as battery life, connectivity, or other hardware statuses. The user 702 can activate user interface elements by touching an area occupied by a respective user interface element. In this manner, the user 702 interacts with the applications of the mobile device 700. For example, touching the area occupied by a particular icon included in the home screen 706 causes launching of an application corresponding to the particular icon.

The mobile device 700, as shown in FIG. 7, includes an imaging device 708. The imaging device 708 may be a camera or any other device coupled to the mobile device 700 capable of capturing a video stream or one or more successive images. The imaging device 708 may be triggered by the object modeling system 160 or a selectable user interface element to initiate capture of a video stream or succession of images and pass the video stream or succession of images to the object modeling system 160 for processing according to the one or more methods described in the present disclosure.

Many varieties of applications (also referred to as "apps") can be executing on the mobile device 700, such as native applications (e.g., applications programmed in Objective-C, Swift, or another suitable language running on IOS™ or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 700 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 700 includes a social messaging app 710 such as SNAPCHAT® that, consistent with some embodiments, allows users to exchange ephemeral messages that include media content. In this example, the social messaging app 710 can incorporate aspects of embodiments described herein. For example, in some embodiments the social messaging app 710 includes an ephemeral gallery of media created by users the social messaging app 710. These galleries may consist of videos or pictures posted by a user and made viewable by contacts (e.g., "friends") of the user. Alternatively, public galleries may be created by administrators of the social messaging app 710 consisting of media from any users of the application (and accessible by all users). In yet another embodiment, the social messaging app 710 may include a "magazine" feature which consists of articles and other content generated by publishers on the social messaging application's platform and accessible by any users. Any of these environments or platforms may be used to implement concepts of the present inventive subject matter.

In some embodiments, an ephemeral message system may include messages having ephemeral video clips or images which are deleted following a deletion trigger event such as a viewing time or viewing completion. In such embodiments, a device implementing the object modeling system 160 may generate texture models for objects within a video stream and track objects within the ephemeral message, and transmit the ephemeral message to another device using the ephemeral message system.

Software Architecture

Figure 8:
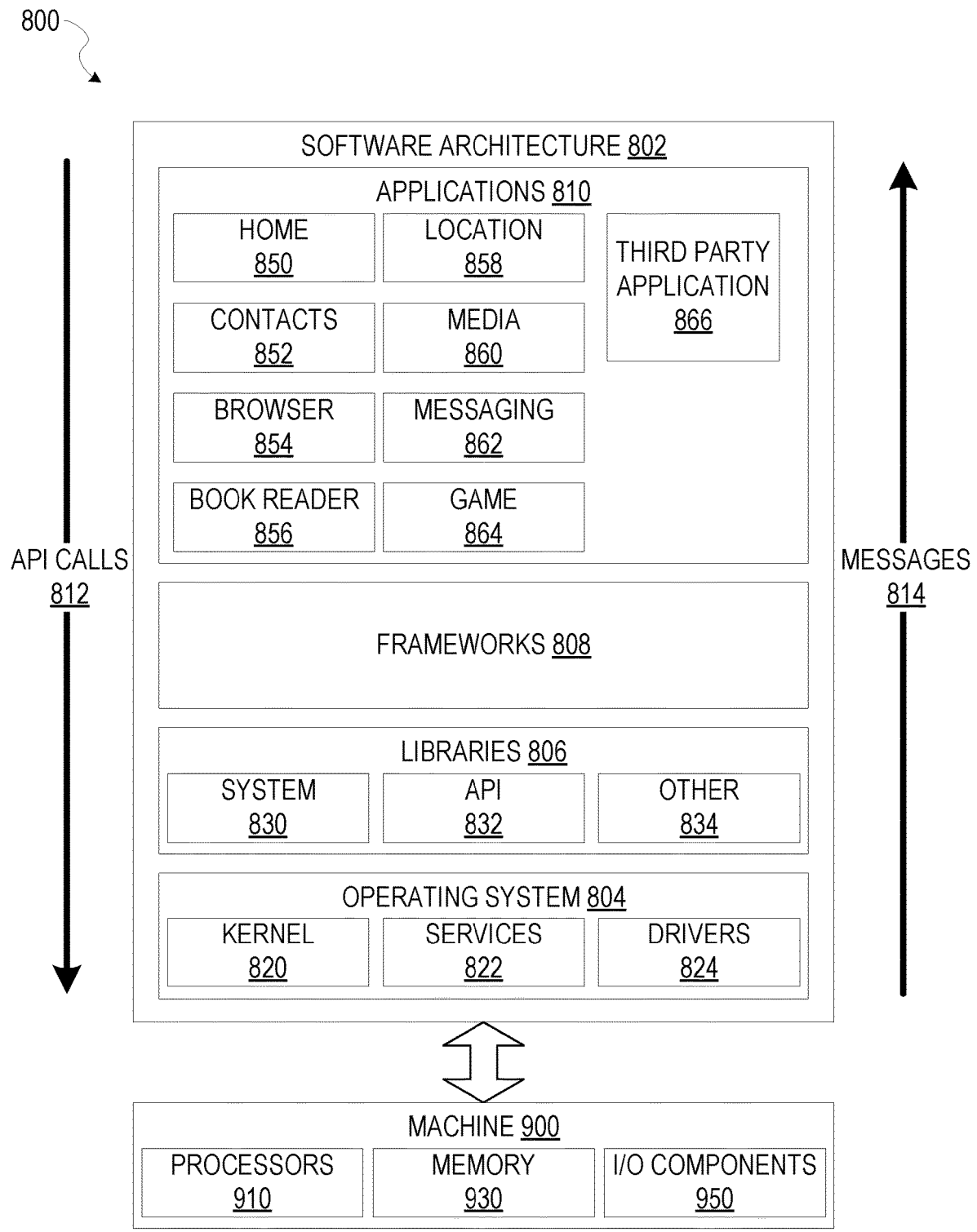
FIG. 8 is a block diagram illustrating an example of a software architecture that may be installed on a machine, according to some example embodiments.

FIG. 8 is a block diagram 800 illustrating an architecture of software 802, which can be installed on the devices described above. FIG. 8 is merely a non-limiting example of a software architecture, and it will be appreciated that many other architectures can be implemented to facilitate the functionality described herein. In various embodiments, the software 802 is implemented by hardware such as machine a 900 of FIG. 9 that includes processors 910, memory 930, and I/O components 950. In this example architecture, the software 802 can be conceptualized as a stack of layers where each layer may provide a particular functionality. For example, the software 802 includes layers such as an operating system 804, libraries 806, frameworks 808, and applications 810. Operationally, the applications 810 invoke application programming interface (API) calls 812 through the software stack and receive messages 814 in response to the API calls 812, consistent with some embodiments.

In various implementations, the operating system 804 manages hardware resources and provides common services. The operating system 804 includes, for example, a kernel 820, services 822, and drivers 824. The kernel 820 acts as an abstraction layer between the hardware and the other software layers consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 806 provide a low-level common infrastructure utilized by the applications 810. The libraries 806 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810, according to some embodiments. For example, the frameworks 808 provide various graphic user interface (GUI) functions, high-level resource management, high-level location services, and so forth. The frameworks 808 can provide a broad spectrum of other APIs that can be utilized by the applications 810, some of which may be specific to a particular operating system or platform.

In an example embodiment, the applications 810 include a home application 850, a contacts application 852, a browser application 854, a book reader application 856, a location application 858, a media application 860, a messaging application 862, a game application 864, and a broad assortment of other applications, such as a third-party application 866. According to some embodiments, the applications 810 are programs that execute functions defined in the programs. Various programming languages can be employed to create the applications 810, structured in a variety of manners, such as object-oriented programming languages (e.g., Objective-C, Java, or C++) or procedural programming languages (e.g., C or assembly language). In a specific example, the third-party application 866 (e.g., an application developed using the ANDROID™ or IOS™ software development kit (SDK) by an entity other than the vendor of the particular platform) may be mobile software running on a mobile operating system such as IOS™, ANDROID™ WINDOWS® PHONE, or another mobile operating system. In this example, the third-party application 866 can invoke the API calls 812 provided by the operating system 804 to facilitate functionality described herein.

Example Machine Architecture and Machine-Readable Medium

Figure 9:
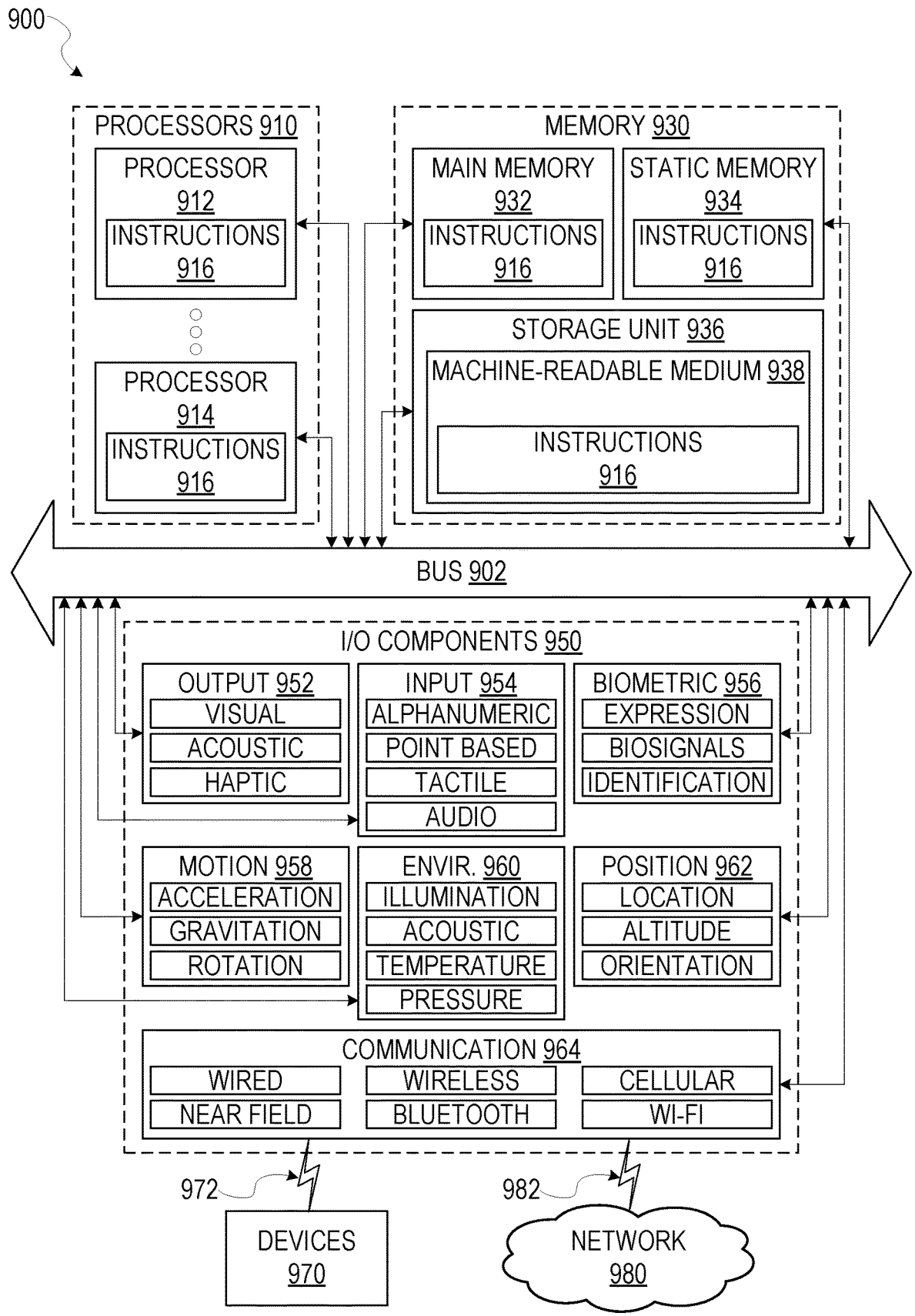
FIG. 9 is a block diagram presenting a diagrammatic representation of a machine in the form of a computer system within which a set of instructions may be executed for causing the machine to perform any of the methodologies discussed herein, according to an example embodiment.

FIG. 9 is a block diagram illustrating components of a machine 900, according to some embodiments, able to read instructions (e.g., processor executable instructions) from a machine-readable medium (e.g., a non-transitory machine-readable storage medium) and perform any of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any of the methodologies discussed herein can be executed. In alternative embodiments, the machine 900 operates as a standalone device or can be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any of the methodologies discussed herein.

In various embodiments, the machine 900 comprises processors 910, memory 930, and I/O components 950, which can be configured to communicate with each other via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) include, for example, a processor 912 and a processor 914 that may execute the instructions 916. The term "processor" is intended to include multi-core processors that may comprise two or more independent processors (also referred to as "cores") that can execute instructions 916 contemporaneously. Although FIG. 9 shows multiple processors 910, the machine 900 may include a single processor with a single core, a single processor with multiple cores (e.g., a multi-core processor), multiple processors with a single core, multiple processors with multiples cores, or any combination thereof.

The memory 930 comprises a main memory 932, a static memory 934, and a storage unit 936 accessible to the processors 910 via the bus 902, according to some embodiments. The storage unit 936 can include a machine-readable medium 938 on which are stored the instructions 916 embodying any of the methodologies or functions described herein. The instructions 916 can also reside, completely or at least partially, within the main memory 932, within the static memory 934, within at least one of the processors 910 (e.g., within the processor's cache memory), or any suitable combination thereof, during execution thereof by the machine 900. Accordingly, in various embodiments, the main memory 932, the static memory 934, and the processors 910 are considered machine-readable media 938.

As used herein, the term "memory" refers to a machine-readable medium 938 able to store data temporarily or permanently and may be taken to include, but not be limited to, random-access memory (RAM), read-only memory (ROM), buffer memory, flash memory, and cache memory. While the machine-readable medium 938 is shown in an example embodiment to be a single medium, the term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., instructions 916) for execution by a machine (e.g., machine 900), such that the instructions, when executed by processors of the machine 900 (e.g., processors 910), cause the machine 900 to perform any of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 950 include a wide variety of components to receive input, provide output, produce output, transmit information, exchange information, capture measurements, and so on. In general, it will be appreciated that the I/O components 950 can include many other components that are not shown in FIG. 9. The I/O components 950 are grouped according to functionality merely for simplifying the following discussion, and the grouping is in no way limiting. In various example embodiments, the I/O components 950 include output components 952 and input components 954. The output components 952 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 954 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 950 include biometric components 956, motion components 958, environmental components 960, or position components 962, among a wide array of other components. For example, the biometric components 956 include components to detect expressions (e.g., hand expressions, facial expressions, vocal expressions, body gestures, or mouth gestures), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 include acceleration sensor components (e.g., accelerometer), gravitation sensor components, rotation sensor components (e.g., gyroscope), and so forth. The environmental components 960 include, for example, illumination sensor components (e.g., photometer), temperature sensor components (e.g., thermometers that detect ambient temperature), humidity sensor components, pressure sensor components (e.g., barometer), acoustic sensor components (e.g., microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 962 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 950 may include communication components 964 operable to couple the machine 900 to a network 980 or devices 970 via a coupling 982 and a coupling 972, respectively. For example, the communication components 964 include a network interface component or another suitable device to interface with the network 980. In further examples, communication components 964 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 970 may be another machine or any of a wide variety of peripheral devices (e.g., a peripheral device coupled via a Universal Serial Bus (USB)).

Moreover, in some embodiments, the communication components 964 detect identifiers or include components operable to detect identifiers. For example, the communication components 964 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 964, such as location via Internet Protocol (IP) geo-location, location via WI-FI® signal triangulation, location via detecting a BLUETOOTH® or NFC beacon signal that may indicate a particular location, and so forth.

Transmission Medium

In various example embodiments, portions of the network 980 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE)

standard, others defined by various standard-setting organizations, other long range protocols, or other data transfer technology.

In example embodiments, the instructions 916 are transmitted or received over the network 980 using a transmission medium via a network interface device (e.g., a network interface component included in the communication components 964) and utilizing any one of a number of well-known transfer protocols (e.g., Hypertext Transfer Protocol (HTTP)). Similarly, in other example embodiments, the instructions 916 are transmitted or received using a transmission medium via the coupling 972 (e.g., a peer-to-peer coupling) to the devices 970. The term "transmission medium" shall be taken to include any intangible medium that is capable of storing, encoding, or carrying the instructions 916 for execution by the machine 900, and includes digital or analog communications signals or other intangible media to facilitate communication of such software.

Furthermore, the machine-readable medium 938 is non-transitory (in other words, not having any transitory signals) in that it does not embody a propagating signal. However, labeling the machine-readable medium 938 "non-transitory" should not be construed to mean that the medium is incapable of movement; the medium should be considered as being transportable from one physical location to another. Additionally, since the machine-readable medium 938 is tangible, the medium may be considered to be a machine-readable device.

Language

Throughout this specification, plural instances may implement components, operations, or structures described as a single instance. Although individual operations of methods are illustrated and described as separate operations, individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   generating an area for an iris within an area of interest by performing operations comprising:
      determining an iris measurement including a portion of the iris obscured by one or more eyelids; and
      generating the area with dimensions or measurements matching or approximating the iris measurement;
   identifying an unknown area of the iris corresponding to a portion of the iris obstructed by the one or more eyelids;
   determining one or more color patches within the area, the one or more color patches corresponding to a colored portion of the iris; and
   translating the one or more color patches to the unknown area.

2. The method of claim 1, the area being circular and the iris measurement comprising a diameter or circumference of the iris, further comprising:
   accessing a set of images captured at a computing device;
   determining, within a portion of each of the set of images, the area of interest containing an eye;
   segmenting a sclera area within the area of interest, the sclera area corresponding to a sclera of the eye; and
   determining a color distribution for the sclera area.

3. The method of claim 1, further comprising:
   performing an initial match of a sclera area to a subset of a set of sclera templates based on a prevailing color of a color distribution of the sclera area, the set of sclera templates generated prior to receiving a set of images;
   selecting a sclera template from the subset of the sclera templates that matches or approximates one or more color variations or patterns within one or more color variations of the sclera area;
   modifying a portion of the selected sclera template; and
   generating a texture for an eye based on the selected sclera template including the modified portion of the selected sclera template.

4. The method of claim 1, wherein generating the area further comprises:
   identifying at least a portion of an edge of the iris within the area of interest;
   determining a circular shape, sized based on the portion of the edge of the iris;
   aligning the circular shape with the portion of the edge of the iris; and
   resizing a size, shape or dimension of the circular shape within the area of interest such that at least a portion of the circular shape intersects or touches an iris area.

5. The method of claim 1, further comprising:
determining that the unknown area is filled with the translated one or more color patches; and
reverting the area of interest to an original color coordinate system for an image prior to translating the color patches.

6. The method of claim 1, further comprising:
generating a texture for an eye by:
extracting an iris area from the area of interest, the iris area corresponding to at least one iris depicted in at least a portion of a set of images;
generating an iris texture for the iris area, the texture based on at least one or more color patches selected from the iris area;
selecting a sclera texture from a set of predetermined sclera textures, the sclera texture selected based on a color distribution of the sclera area; and
blending an edge of the iris texture with a portion of the sclera texture proximate to the iris area.

7. The method of claim 1, further comprising:
identifying a pupil location within the area of interest, the pupil location determined based on an iris area and a sclera area;
determining a first point of focus for eye, the first point of focus based on the pupil location; and
modifying a portion of a texture for the eye to change the first point of focus to a second point of focus, the second point of focus directed to a position different than that of the first point of focus.

8. The method of claim 1, further comprising:
determining a set of facial landmarks for a face depicted within a set of images;
determining a face model for the face depicted within the set of images, the face model having a three-dimensional representation of eyes and aligned with at least a portion of the set of facial landmarks for the face;
identifying a pupil location within the area of interest, the pupil location determined based on an iris area and a sclera area; and
tracking a point of focus of the eye based on the pupil location and the face model.

9. The method of claim 1, further comprising:
determining an iris measurement comprising a diameter or circumference of the iris including a portion of the iris obscured by one or more eyelids; and
generating a circular shape with dimensions or measurements matching or approximating the iris measurement.

10. The method of claim 9, further comprising resizing a size, shape or dimension of the circular shape within the area of interest such that at least a portion of the circular shape intersects or touches an iris area.

11. A system, comprising:
one or more processors; and
non-transitory processor-readable storage medium storing processor-executable instructions that, when executed by the one or more processors, cause the one or more processors to perform operations comprising:
generating an area for an iris within an area of interest by performing operations comprising:
determining an iris measurement including a portion of the iris obscured by one or more eyelids; and
generating the area with dimensions or measurements matching or approximating the iris measurement;
identifying an unknown area of the iris corresponding to a portion of the iris obstructed by the one or more eyelids;
determining one or more color patches within the area, the one or more color patches corresponding to a colored portion of the iris; and
translating the one or more color patches to the unknown area.

12. The system of claim 11, wherein the operations further comprise:
accessing a set of images captured at a computing device;
determining, within a portion of each of the set of images, the area of interest containing an eye;
segmenting a sclera area within the area of interest, the sclera area corresponding to a sclera of the eye; and
determining a color distribution for the sclera area.

13. The system of claim 11, wherein the operations further comprise:
performing an initial match of a sclera area to a subset of a set of sclera templates based on a prevailing color of a color distribution of the sclera area, the set of sclera templates generated prior to receiving a set of images;
selecting a sclera template from the subset of the sclera templates that matches or approximates one or more color variations or patterns within one or more color variations of the sclera area;
modifying a portion of the selected sclera template; and
generating a texture for an eye based on the selected sclera template including the modified portion of the selected sclera template.

14. The system of claim 11, wherein generating the area comprises:
identifying at least a portion of an edge of the iris within the area of interest;
determining a circular shape, sized based on the portion of the edge of the iris;
aligning the circular shape with the portion of the edge of the iris; and
resizing a size, shape or dimension of the circular shape within the area of interest such that at least a portion of the circular shape intersects or touches an iris area.

15. The system of claim 11, wherein the operations further comprise:
determining the unknown area is filled with the translated one or more color patches; and
reverting the area of interest to an original color coordinate system for an image prior to translating the color patches.

16. The system of claim 11, wherein the operations further comprise:
generating a texture for an eye by:
extracting an iris area from the area of interest, the iris area corresponding to at least one iris depicted in at least a portion of a set of images;
generating an iris texture for the iris area, the texture based on at least one or more color patches selected from the iris area;
selecting a sclera texture from a set of predetermined sclera textures, the sclera texture selected based on a color distribution of the sclera area; and
blending an edge of the iris texture with a portion of the sclera texture proximate to the iris area.

17. A non-transitory processor-readable storage medium storing processor executable instructions that, when executed by a processor of a machine, cause the machine to perform operations comprising:
generating an area for an iris within an area of interest by performing operations comprising:
determining an iris measurement including a portion of the iris obscured by one or more eyelids; and generating the area with dimensions or measurements matching or approximating the iris measurement;

identifying an unknown area of the iris corresponding to a portion of the iris obstructed by the one or more eyelids;

determining one or more color patches within the area, the one or more color patches corresponding to a colored portion of the iris; and translating the one or more color patches to the unknown area.

18. The non-transitory processor-readable storage medium of claim 17, wherein the operations further comprise:

accessing a set of images captured at a computing device;

determining, within a portion of each of the set of images, the area of interest containing an eye;

segmenting a sclera area within the area of interest, the sclera area corresponding to a sclera of the eye; and determining a color distribution for the sclera area.

19. The non-transitory processor-readable storage medium of claim 17, wherein the operations further comprise:

performing an initial match of a sclera area to a subset of a set of sclera templates based on a prevailing color of a color distribution of the sclera area, the set of sclera templates generated prior to receiving a set of images;

selecting a sclera template from the subset of the sclera templates that matches or approximates one or more color variations or patterns within one or more color variations of the sclera area;

modifying a portion of the selected sclera template; and generating a texture for an eye based on the selected sclera template including the modified portion of the selected sclera template.

20. The non-transitory processor-readable storage medium of claim 17, wherein generating the area comprises:

identifying at least a portion of an edge of the iris within the area of interest;

determining a circular shape, sized based on the portion of the edge of the iris;

aligning the circular shape with the portion of the edge of the iris; and resizing a size, shape or dimension of the circular shape within the area of interest such that at least a portion of the circular shape intersects or touches an iris area.

* * * * *